Oct. 20, 1936.  W. A. LIPPINCOTT ET AL  2,058,243
MACHINE FOR BUILDING RUBBER CYLINDERS
Filed March 16, 1933    2 Sheets-Sheet 1
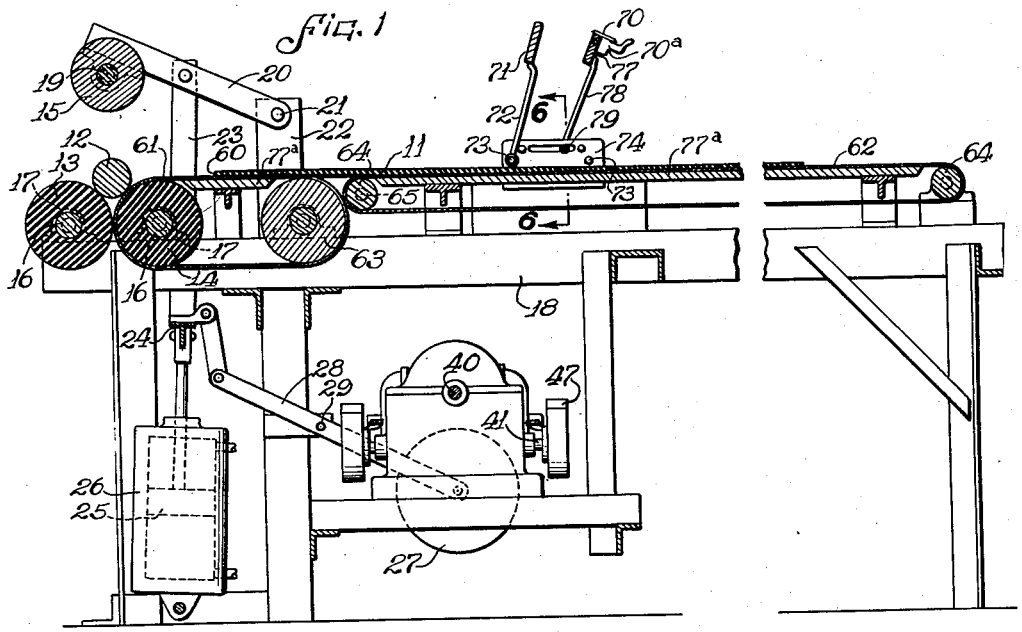
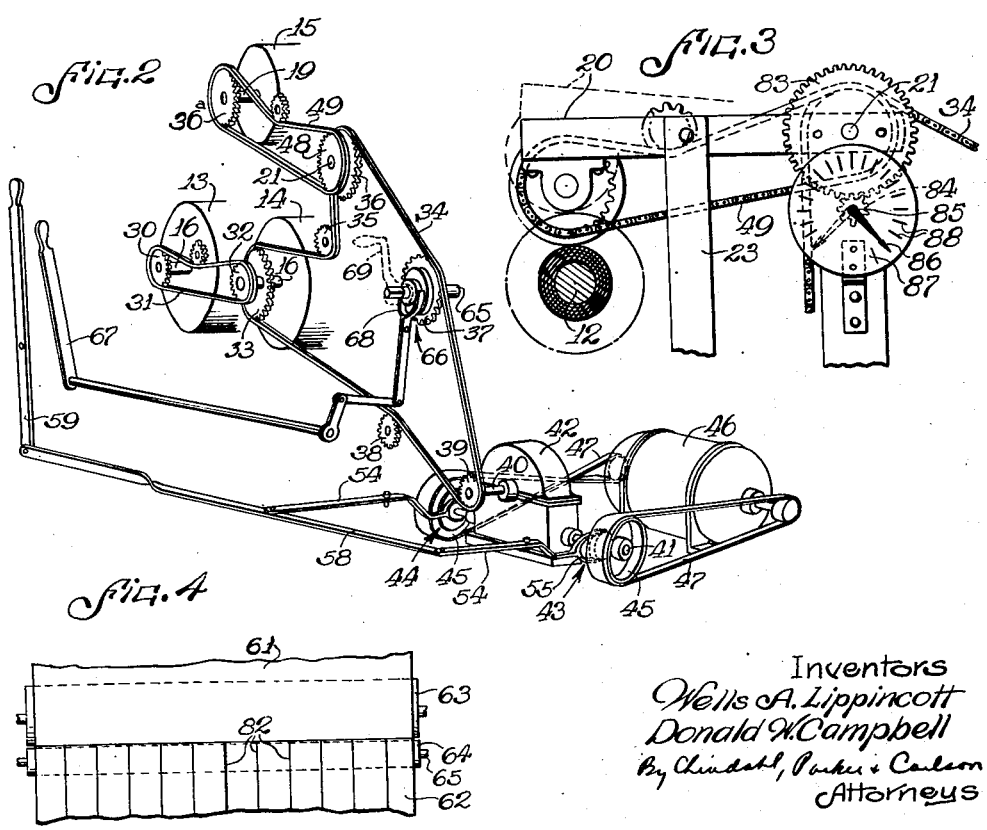
Inventors
Wells A. Lippincott
Donald W. Campbell
Attorneys

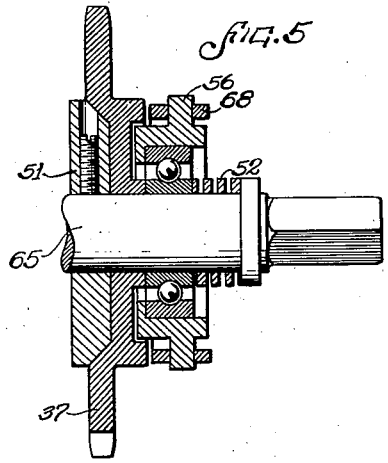
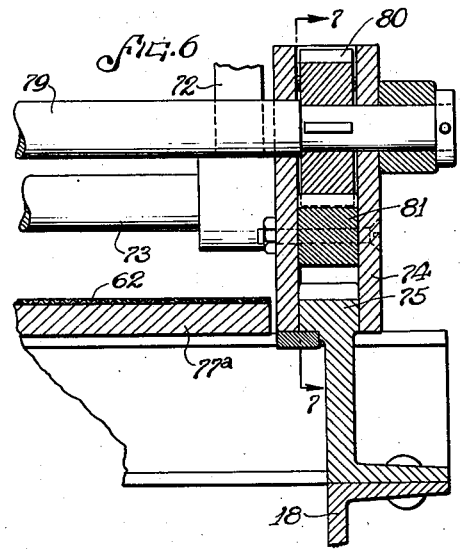
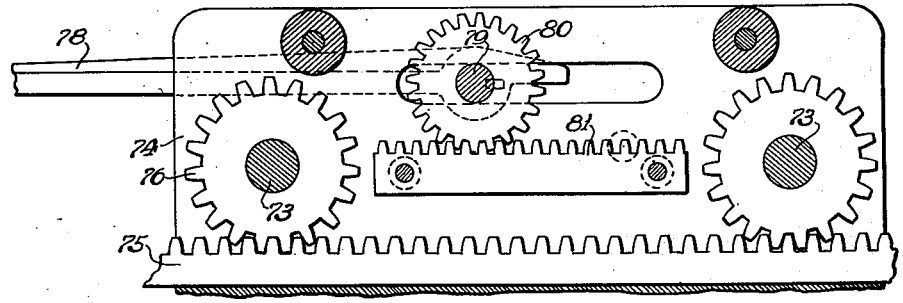
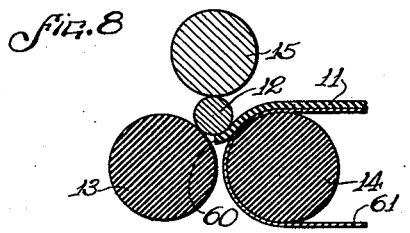
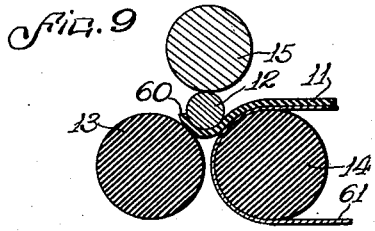
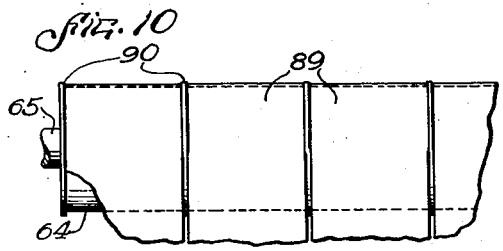

Patented Oct. 20, 1936

2,058,243

UNITED STATES PATENT OFFICE 2,058,243

MACHINE FOR BUILDING RUBBER CYLINDERS

Wells A. Lippincott, Oak Park, and Donald W. Campbell, Chicago, Ill., assignors to Ideal Roller & Manufacturing Company, Chicago, Ill., a corporation of Illinois Application March 16, 1933, Serial No. 660,996

6 Claims. (Cl. 242—66)

This invention relates to the formation of cylinders of rubber or like material and more particularly to a machine by which one or more sheets of raw or unvulcanized rubber may be wound upon a core to form a cylinder. As used herein, the term rubber contemplates and is intended to include all rubber substitutes or material having like properties.

Owing to the softness and low tensile strength of the rubber commonly employed in forming rollers for printing presses and the consequent difficulty of handling large sheets of such rubber, such rollers have heretofore been wound manually by rolling the core over the sheets of rubber while the latter rest upon a supporting table. This method of winding is costly and a uniform structure cannot be obtained due to the inability of the workmen to apply uniform pressure to the rubber during winding.

The primary object of the present invention is to overcome the above objections through the provision of a machine by which the rubber sheets can be handled conveniently and fed to the core on which they are wound under uniform pressure.

Another object is to provide a machine of the above character having novel means for applying pressure to the rubber being wound so that irregularities in thickness of the sheet will be compensated for automatically and the entrapment of air bubbles between successive layers will be avoided.

Still another object is to provide a novel means for feeding the raw rubber sheets so as to avoid the occurrence of wrinkles in the layers of rubber.

A further object is to provide a machine for winding successive sheets on a core having a novel means for handling successive sheets so that their trailing and leading edges may be brought squarely into abutment.

The invention also resides in the provision of novel means for facilitating the trimming of the rubber sheets.

Other objects and advantages of the invention will become apparent from the following detailed description taken in connection with the accompanying drawings, in which Figure 1 is a longitudinal vertical central section through a machine embodying the features of the present invention.

Fig. 2 is a fragmentary perspective view of the driven parts and the means for driving the same.

Fig. 3 is a fragmentary elevational view showing the pressure roller and means for indicating the diameter to which the cylinder has been built up.

Fig. 4 is a fragmentary plan view of the conveyors for supporting the rubber sheets.

Fig. 5 is a sectional view of one of the drive clutches.

Fig. 6 is a section taken along the line 6—6 of Fig. 1.

Fig. 7 is a section taken along the line 7—7 of Fig. 6.

Figs. 8 and 9 are fragmentary diagrammatic views illustrating on an exaggerated scale, the relative sizes of the supporting and pressure rollers and different positions of a rubber sheet at the start of the winding operation.

Fig. 10 is a fragmentary plan view of a modified form of conveyor.

With the machine selected for purposes of illustration, a rubber cylinder is built up to the desired diameter by winding sheets 11 of raw or unvulcanized rubber successively and in end-to-end relation upon a mandrel or core 12 which is somewhat longer than the cylinder to be formed and of reduced diameter at opposite ends to provide trunnions through the medium of which the finished roller is mounted. Preparatory to and during winding, the core is disposed between and rests upon two parallel and horizontally disposed supporting rollers 13 and 14 which are of such diameter and so spaced relative to each other that a large number of different core sizes may be accommodated. During winding pressure is applied uniformly throughout the length of the core 12 by one or more vertically movable rollers, one being shown in the present instance and indicated by the numeral 15. The supporting rollers are of a length at least equal to the longest cylinder to be formed and each has a central core or shaft 16, the opposite projecting ends of which are journaled in bearings 17 located at one end of a horizontal table frame 18.

To mount the pressure roller 15 for movement toward and away from the supporting rollers, the shaft 19 of the former is journaled at opposite ends upon arms 20 pivoted at 21 on posts 22 upstanding from the table. Intermediate their ends, the arms 20 are pivotally connected to two rods 23 on opposite sides of the table joined beneath the table by a cross-bar 24 which is connected to a piston 25 reciprocable in a vertical cylinder 26. The weight of the roller 15 is counterbalanced by a weight 27 operating upon the bar 24 through the medium of a lever 28 pivoted at 29. By admitting pressure fluid to the cylinder above the piston, the roller 15 will be lowered and pressed against the cylinder being formed with a force of any desired magnitude. The roller 15 is raised automatically to an out-of-the-way position (Fig. 1) by admitting pressure fluid to the lower end of the cylinder.

In order to wind the raw rubber sheets tightly around the core 12 and insure the formation of a true cylinder, the supporting rollers 13 and 14 and the pressure roller 15 are driven positively in the present instance. For this purpose, a sprocket 30 fast on the shaft 16 of the roller 13 is connected by an endless chain 31 to a sprocket 32 of similar size on the shaft of the roller 14. Fast on the latter shaft is a sprocket 33 engaged by an endless chain 34 which extends around sprockets 35, 36, 37, 38 and 39, the latter being fast on a shaft 40 driven from a shaft 41 through suitable speed-reduction gearing within a box 42. During actual winding, the rollers 13 and 14 are rotated counter-clockwise as viewed in Fig. 1.

To enable the rollers to be driven in either direction, the shaft 41 is adapted to be coupled by means of one or the other of two clutches 43 and 44 to one of two pulleys 45 loose on the shaft 41 and driven in opposite directions by an electric motor 46 through the medium of belts 47. To drive the roller 15 while at the same time permitting vertical swinging thereof about the pivot 21, the sprocket 36 is mounted with its axis located coincident with the pivot and is operatively connected to a sprocket 36ª on the roller through the medium of a sprocket 48 and an endless chain 49. The roller 15 is thus driven in the same direction as the roller 14.

The clutches 43 and 44 may be of any suitable construction preferably of the friction type. The pulleys 45 constitute the driving members for these clutches each of which is normally maintained disengaged by a spring and arranged to be engaged by shifting a lever 54 against the action of the clutch spring. The levers 54 for the two clutches are connected at their other ends by a link 58 adapted to be shifted by a control lever 59, the arrangement being such that in opposite limit positions of the lever 59, one clutch will be engaged and the other disengaged while in an intermediate position both clutches will be disengaged.

Means is provided for supporting one sheet of rubber and advancing the same bodily toward the roller 14 while maintaining its trimmed leading edge 60 substantially parallel to the roller axis so that all points along said edge will contact the core 12 substantially simultaneously. In the present instance, this means comprises two endless belts 61 and 62 arranged in end-to-end relation with their ends arranged closely adjacent each other so that the two form in effect a single conveyor of a length somewhat greater than the sheet 11. Both belts are of a width substantially equal to the lengths of the rollers 13 and 14. The belt 61 is composed of flexible material and extends around the supporting roller 14 and a roller 63 of similar size so as to be driven by the former. For a purpose which will appear later, this belt is substantially shorter in length than the sheets 11 ordinarily used.

The belt 62 extends around and is supported by rollers 64 rotatably mounted on the table and preferably smaller in diameter than the roller 63 so that the belt may be disposed above the roller 63 slightly overlying the latter as shown in Fig. 1. The rubber sheet is thus carried readily from one belt to the other. Preferably, the belt 62 is longer and wider than the longest rubber sheets employed so that a sheet may be placed thereon in correct position, trimmed, and the upper surface worked with solvent preparatory to winding.

Means is provided for enabling the belt 62 to be driven either simultaneously with or independently of the belt 61. Herein this means comprises the sprocket 37 which is loose on the shaft 65 of one roller 64 and constitutes the driving member of a clutch 66. The driven clutch member is in the form of a disk 51 (see Fig. 5) fast on the shaft 65 and normally maintained in frictional gripping engagement with a surface 50 on the sprocket 37 by a spring 52. To disengage the clutch, a control lever 67 is shifted in a direction to move a yoke 68 against the action of the spring 52. The belt 62 may also be advanced independently of the belt 61 by the aid of a hand crank 69 fitted onto the projecting end of the shaft 65.

Owing to the soft and pliable character of the raw rubber, the sheet 11 is flattened out or decreased in thickness somewhat under the pressure to which it is subjected as it comes between the roller 14 and the core 12 or the partially wound cylinder. This causes a slight elongation of the sheet with the result that wrinkles tend to develop in the sheet adjacent and in advance of its first line of contact with the cylinder being formed. To prevent the building up of wrinkles of any substantial size and the consequent possibility of such wrinkles being carried in between the core and the roller 14, that portion of the sheet on the belt 61 is maintained under a tension sufficient to take up any slack tending to develop but not sufficient to stretch the sheet to an objectionable degree. Herein this is accomplished by advancing the belt 62 at a speed slightly less than that at which the belt 61 is driven. Since the belt 61 is relatively short, the longitudinal tension developed in the sheet being wound as a result of the slower speed of the belt 62 causes the short length of the sheet 11 contacting the belt 61 to slip backwardly along the belt and thus take up any slack which may occur adjacent the core. By properly proportioning the sizes of the drive sprockets, any desired speed relation may be obtained. To reduce the minimum tension under which the sheet must be placed, it is preferred to make the belt 61 as short as practicable.

Raw rubber sheets such as are used in building cylinders for printing presses possess certain irregularities in thickness causing uneven distribution of the applied pressure along the line where the sheet initially comes in contact with the core 12 and the roller 14. This tends to produce an uneven squeezing back of the rubber and the formation of an irregular wrinkled surface. There is also danger of air bubbles becoming entrapped between the adjacent layers of rubber resulting in poor bonding thereof. These difficulties are overcome effectually and the use of objectionably high pressure is avoided in the present instance by constructing the supporting rollers 13 and 14 of pliable or resilient material such as vulcanized rubber which is adapted to yield slightly under the pressure employed and cause a more uniform distribution of the pressure along the lines of application thereof. In addition, owing to the pliable character of the supporting rollers, the pressure is applied to the partially wound cylinder over a larger area resulting in the formation of a more truly cylindrical roller. Since both of the supporting rollers are composed of resilient material, they will yield equally under the pressure applied by the roller 15 and thus avoid lateral displacement of the core during winding. In view of the greater stress under which the roller 15 is placed, it is preferably formed of metal.

The use of two supporting rollers and a separate pressure roller also contributes to the trueness of the cylinder formed and the ready adaptability of the machine to the formation of cylinders of widely varying sizes and lengths. Thus it will be seen that pressure is applied to the cylinder being built at three annularly spaced points so that during winding the cylinder is firmly held against lateral displacement without the aid of guide or other devices engaging the core 12. The core may be positioned readily for winding simply by placing the same upon the rollers 13 and 14. Any length of core shorter than the supporting rollers may be accommodated.

In view of the soft and readily extensible character of the raw rubber from which the cylinder is formed, it has been found that a more perfect cylinder can be formed by compressing the rubber at three annularly spaced points and driving the rollers 13, 14 and 15 positively as above described. Such positive drive is obtained in the present instance without interfering with the location of the core 12 in winding position and without affecting the adaptability of the machine to the winding of cylinders of varying sizes and lengths.

From an examination of Figs. 8 and 9, it will be apparent that as the leading edge 60 of the sheet 11 comes between the roller 14 and the core in each revolution of the latter, the effective diameter of the core along the line 7 of contact with the roller 14 is, owing to the thickness of the sheet 11, greater than along the roller 13; consequently, the roller 14 tends to drive the core at a reduced rate. In a similar way the driving effect of the roller 13 relative to that of the roller 15 is decreased while the leading edge is disposed between the rollers 13 and 15. In view of this differential driving effect, it has been found that there is a tendency for the core 12 to creep or become displaced laterally during winding in the direction of the roller 14 with a consequent variation in the pressure to which the sheet is subjected as it comes between the core and the roller 14. This objection has been overcome in the present instance by driving the roller 13 at a slightly slower peripheral speed than the roller 14 and driving the roller 15 at a still slower peripheral speed. Preferably, such different speeds are obtained by constructing the rollers 14, 13 and 15 of progressively decreasing effective diameters which enables the rollers to be driven at equal speeds. This arrangement not only overcomes the objection above mentioned but also causes an increased pressure to be produced between the core and the roller 14 as the diameter of the core increases which increased pressure is permissible after several layers have been wound onto the core.

Means is provided for facilitating the trimming of the leading and trailing edges of raw rubber sheets during the winding operation. Herein this means comprises a rotary knife 70 mounted on a carriage 70ª slidable in a T-slot extending longitudinally of a bar 71 which extends transversely of the table 18. During trimming by the knife 70, the sheet is placed upon a cutting plate 71 of zinc or other suitable material rigid at opposite ends with elongated arms 72 pivoted upon a carriage which is arranged for movement longitudinally of the table. The carriage comprises two shafts 73 connecting two frames 74 which are mounted on two guide bars 75 extending longitudinally of the table on opposite sides thereof. To maintain the shafts perpendicular at all times to the direction of motion of the belts 61 and 62, spur gears 76 are mounted on the shafts in mesh with rack teeth on the guide bars 75. The arms 72 are pivoted upon one of the shafts 73. The plate 71 is secured at opposite ends to arms 78 pivotally mounted on a shaft 79 journaled at opposite ends in the frames 74 and carrying gears 80 which mesh with rack bars 81 on the frames.

With the foregoing arrangement, it will be apparent that the cutting board 71 and the knife guide 77 are mounted for movement longitudinally of the belts 61 and 62 and also relative to each other while being maintained at all times in positions exactly perpendicular to the direction of movement of the belts. Thus, the leading or trailing edge of the sheet may be trimmed off squarely when positioned either on the belt 61 or on the belt 62, the bar 71 and the guide 77 being swung downwardly against the belt and supported during trimming upon one of two plates 77ª positioned beneath the upper runs of the belts. After trimming, the cutting bar and the knife guide may be swung upwardly into an out of the way position as shown in Fig. 1.

Winding of a cylinder with the machine above described is accomplished in the following manner. A sheet of raw rubber washed on one side is placed, with the latter side down, onto the belt 62 and centered thereon with the aid of guide lines 82 (see Fig. 4) marked on the belt. The trimming carriage is next shifted to a position opposite the leading edge of the sheet and the latter edge is raised and laid upon the plate 71. The knife guide 70 is then swung downwardly and the knife carriage moved along the guide to trim or square off the edge of the sheet after which the plate and knife are swung back out of the way.

After the upper surface of the sheet is washed with solvent in the usual way, pressure fluid is admitted to the cylinder 26 to lower the pressure roller 15 against the core 12 then supported by the rollers 13 and 14. The clutches 43, 44 and 66 are then conditioned for movement of the conveyors 61 and 62 toward the core 12. As the sheet advances, the leading edge passes from the belt 62 onto the belt 61 and is carried by the latter in between the rotating roller 14 and the core, all points along the leading edge 60 contacting the core substantially simultaneously. In view of the sticky character of the upper surface of the sheet, the leading edge of the latter adheres more readily to the core 12 than to the belt 61 as shown in Fig. 8 and thus is carried into contact with the supporting roller 13 and then between the core and the pressure roller 15.

As the trailing end of the sheet 11 comes onto the belt 61 and approaches the core 12, the active clutch is disengaged to stop the belts during trimming of said trailing end to remove irregularities resulting from squeezing out and elongation of the sheet during winding. To effect such trimming, the knife carriage is advanced until the arms 72 overlie the belt 61. With the cutting bar 71 placed beneath said trailing end, the knife guide is positioned properly and the knife moved across the sheet. Then another sheet is positioned upon the belt 62 and its leading edge trimmed as above described. To bring the two trimmed edges into abutment, the clutch 66 is first disengaged and then by means of the handcrank 69, the belt 62 is advanced independently of the belt 61 and the leading edge of the second sheet laid upon the belt 61 in exact abutment with the trailing edge of the first sheet. Then both belts are again started and the winding continued by reengagement of the clutch 66 and one of the clutches 43 and 44. Successive sheets are thus wound onto the core until the cylinder has been built up to the desired diameter.

Where very soft rubber is employed in building a roller in the manner above described, the trailing edge of one sheet and the leading edge of the next may be lapped over each other thereby avoiding the trimming operations above described. The lap joint thus formed is flattened out sufficiently under the pressure applied in the rolling operation.

In order to form a simple means for indicating continuously the diameter to which the cylinder has been wound, advantage is taken of the present manner of mounting the pressure roller 15 which, it will be observed, moves upwardly as the diameter of the cylinder increases. To this end, a gear 83 or segment thereof is mounted concentric with the axis 21 and made rigid with the swingable arms 20. The gear meshes with a pinion 84 of substantially smaller pitch diameter mounted on a loose shaft 85 carrying an indicator arm 86 which is swingable around a stationary disk 87 bearing a suitable scale 88. With this arrangement, it will be apparent that the movement of the arm 20 supporting the roller 15 is multiplied and transmitted to the pointer which indicates at all times the position of the roller 15 which corresponds to the diameter to which the cylinder has been wound. Thus, when the desired diameter is obtained, the rollers 13, 14 and 15 are stopped and the sheet cut off adjacent the core. The rollers may be started again to wind up the trailing end of the sheet.

If desired, in order to prevent any lateral shifting of the belt 62 on its supporting rollers 64, the belt may (see Fig. 10) be made in a plurality of independent sections 89 mounted side by side and held against lateral movement by annular ribs 90 extending around the rollers 64.

From the foregoing, it will be apparent that the machine above described is capable of winding a cylinder having a substantially cylindrical contour and uniform compactness of structure. The machine is adaptable to a wide range of different sizes of cylinders and will accommodate any cylinder of a length less than the supporting rollers 13 and 14. Mounting of the core preparatory to winding and removal of the complete cylinder is greatly facilitated and manual handling of the successive rubber sheets in initially positioning them for winding, in trimming the sheets, and bringing the successive sheets into abutment is reduced to a minimum. Accordingly, the cost of manufacturing the cylinder is materially reduced and a more accurate and uniform product is obtained than with the methods heretofore employed.

We claim as our invention:

1. A machine for winding a sheet of rubber upon a core to form a cylinder comprising, in combination, a roller, means for urging said core yieldably toward said roller, an endless belt extending around said roller and movable therewith to advance a sheet of rubber in between the roller and said core, and a second endless belt arranged in end-to-end relation with respect to said first mentioned belt adjacent the latter and adapted to support a sheet of rubber to be fed onto the first belt, power driven means for advancing said belts in the same direction and in fixed relation to each other including means by which said second belt may be advanced independently of the first belt.

2. A machine for winding a sheet of rubber upon a core to form a cylinder comprising, in combination, a roller, means for urging said core yieldably toward said roller, an endless belt extending around said roller having a supporting surface shorter in length than said sheet, a second endless belt arranged at the end of said first belt opposite said roller and having a supporting surface of a length substantially greater than said first mentioned belt, and a common power driven means for advancing said belts simultaneously toward said roller but disengageable from said second belt to permit independent advance thereof.

3. A machine for winding a sheet of rubber upon a core to form a cylinder comprising, in combination, a roller, means for urging said core yieldably toward said roller, an endless belt extending around said roller and movable therewith to advance a sheet of rubber in between the roller and said core, a second endless belt arranged in end-to-end relation to said first belt and cooperating therewith to support a sheet of rubber, means for advancing said belts toward said roller simultaneously but with the second belt moving at a slower speed than the first belt whereby to produce a drag on the portion of the sheet supported by the first belt.

4. A machine for winding a sheet of rubber upon a core to form a cylinder comprising, in combination, a roller, means for supporting said core and urging the same yieldably toward said roller, a carrier for supporting and moving a sheet of rubber in between said roller and core, a second carrier arranged at the end of said first carrier opposite said roller and adapted to support the trailing end portion of a sheet while the leading end portion is supported upon the first carrier, and power driven means for advancing said first carrier toward said roller at a uniform speed and said second carrier toward the first carrier at a slower uniform speed bearing a fixed relation to the speed of said first carrier.

5. A machine for winding a sheet of rubber upon a core to form a cylinder comprising, in combination, a roller, means supporting said core and pressing the same into peripheral contact with said roller, a carrier having a supporting surface shorter in length than said sheet and adapted to advance the sheet in between said roller and said core, a member contacting said sheet adjacent the end of said carrier opposite said roller, and means for advancing said member simultaneously with and in the same direction as said carrier but at a slower speed whereby to take up any slack developing in said sheet adjacent said core.

6. A machine for winding a rubber sheet upon a core to form a cylinder comprising, in combination, a plurality of rotatably supported parallel rollers disposed in closely spaced relation and adapted to engage said core at annularly spaced points, one of said rollers being mounted for bodily lateral movement to permit insertion of said core between the rollers, means for urging said movable roller yieldably toward said core, means for feeding a sheet of rubber in between said core and one of said rollers, and means for driving said rollers to cause rotation of the successive rollers contacted by said sheet at progressively decreasing peripheral speeds.

WELLS A. LIPPINCOTT.
DONALD W. CAMPBELL.